(12) United States Patent
Shih et al.

(10) Patent No.: US 11,770,144 B2
(45) Date of Patent: Sep. 26, 2023

(54) COMMUNICATION APPARATUS HAVING FEEDBACK CALIBRATION MECHANISM

(71) Applicant: REALTEK SEMICONDUCTOR CORPORATION, Hsinchu (TW)

(72) Inventors: Kuan-Yu Shih, Hsinchu (TW); Hsiao-Tsung Yen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/702,003

(22) Filed: Mar. 23, 2022

(65) Prior Publication Data

US 2022/0416824 A1    Dec. 29, 2022

(30) Foreign Application Priority Data

Jun. 25, 2021  (TW) ................................ 110123408

(51) Int. Cl.
    *H04B 1/04*    (2006.01)
(52) U.S. Cl.
    CPC ... *H04B 1/0475* (2013.01); *H04B 2001/0408* (2013.01)
(58) Field of Classification Search
    CPC ............... H04B 1/0475; H04B 1/0458; H04B 2001/0408
    USPC .................................................. 375/295–297
    See application file for complete search history.

(56) References Cited

U.S. PATENT DOCUMENTS

| | | | | |
|---|---|---|---|---|
| 4,290,070 A | * | 9/1981 | Tanaka | H01Q 7/00 343/866 |
| 4,439,741 A | * | 3/1984 | Turner, Jr. | H03F 3/245 330/149 |
| 4,799,066 A | * | 1/1989 | Deacon | H04B 1/0458 343/860 |

(Continued)

FOREIGN PATENT DOCUMENTS

| | | | |
|---|---|---|---|
| CN | 1605154 A * | 4/2005 | ............ H03H 7/48 |
| EP | 0920730 B1 | 3/2004 | |

(Continued)

OTHER PUBLICATIONS

OA letter of a counterpart TW application (appl. No. 110123408) dated Apr. 14, 2022.

(Continued)

*Primary Examiner* — Emmanuel Bayard
(74) *Attorney, Agent, or Firm* — WPAT, P.C (57) ABSTRACT

The present invention discloses a communication apparatus having feedback calibration mechanism. A signal transmission circuit generates a RF analog signal according to a digital signal. A signal amplifying circuit amplifies the RF analog signal to generate an amplified analog signal. A LC impedance matching circuit transmits the amplified analog signal to the antenna to perform transmission. A feedback calibration circuit includes a feedback inductive circuit and a calibration circuit. A feedback inductive circuit is inductively coupled to the LC impedance matching circuit to receive the amplified analog signal to generate a feedback signal. A calibration circuit determines a distorted amount of the feedback signal relative to the RF analog signal to modify an operation parameter of at least one of the signal transmission circuit and the signal amplifying circuit to decrease the distorted amount.

8 Claims, 6 Drawing Sheets

(56) References Cited

U.S. PATENT DOCUMENTS

| | | | | |
|---|---|---|---|---|
| 5,408,691 | A * | 4/1995 | Takao | H04B 1/40 455/99 |
| 6,566,944 | B1 * | 5/2003 | Pehlke | H03F 1/0233 330/136 |
| 8,611,836 | B2 | 12/2013 | Ripley et al. | |
| 10,483,937 | B2 | 11/2019 | Chen | |
| 10,680,574 | B1 * | 6/2020 | Hrivnak | H04B 1/0458 |
| 10,985,617 | B1 * | 4/2021 | Johnston | H02J 50/20 |
| 2002/0175870 | A1 * | 11/2002 | Gleener | H03H 7/40 343/750 |
| 2009/0184761 | A1 * | 7/2009 | Reynaert | H03F 3/2171 330/10 |
| 2011/0080051 | A1 * | 4/2011 | Lee | H02J 50/40 307/104 |
| 2011/0086600 | A1 * | 4/2011 | Muhammad | H04B 1/0458 455/120 |
| 2013/0207731 | A1 * | 8/2013 | Balteanu | H03F 3/211 330/296 |
| 2020/0212862 | A1 * | 7/2020 | Hulsteijn | H04B 1/0458 |
| 2020/0343873 | A1 * | 10/2020 | Hrivnak | H03H 7/38 |
| 2021/0194437 | A1 | 6/2021 | Stockert | |
| 2021/0203284 | A1 * | 7/2021 | Samelis | H03F 3/195 |

FOREIGN PATENT DOCUMENTS

| | | | | |
|---|---|---|---|---|
| EP | 3070839 | A1 * | 9/2016 | H03F 1/0222 |
| EP | 2522072 | B1 * | 7/2020 | H03F 1/083 |
| JP | 2011004186 | A * | 1/2011 | |
| WO | WO-2019240668 | A9 * | 1/2021 | H02J 50/12 |

OTHER PUBLICATIONS

OA letter of a counterpart TW application (appl. no. 110123408) mailed on Feb. 8, 2022.Summary of the OA letter: 1. Claims 1~4 and 9 are rejected as being unpatentable over the disclosure of the cited reference 1 (EP 0920730 B1, also published as U.S. Pat. No. 6023197A). 2. Claims 5~8 and 10 are allowable. Correspondence bewteen claims of TW counterpart application and claims of US application: 1. Claims 1~10 in TW counterpart application correspond to claims 1~10 in US application, respectively.

* cited by examiner

COMMUNICATION APPARATUS HAVING FEEDBACK CALIBRATION MECHANISM

BACKGROUND OF THE INVENTION

1. Field of the Invention

The present invention relates to a communication apparatus having feedback calibration mechanism.

2. Description of Related Art

In a communication apparatus, a RF signal generated from the signal transmission circuit needs to be amplified by using a power amplifier circuit so as to be further transmitted externally through the antenna. However, since the intensity of the amplified signal generated by the power amplifier circuit is much larger than the original RF signal, distortion easily occurs. If an efficient calibration mechanism does not exist, the output linearity of the power amplifier circuit drops accordingly.

SUMMARY OF THE INVENTION

In consideration of the problem of the prior art, an object of the present invention is to supply a communication apparatus having feedback calibration mechanism.

The present invention discloses a communication apparatus having feedback calibration mechanism that includes a signal transmission circuit, a signal amplifying circuit, an antenna, a LC impedance matching circuit and a feedback calibration circuit. The signal transmission circuit is configured to generate a RF analog signal according to a digital signal. The signal amplifying circuit is configured to amplify the RF analog signal to generate an amplified analog signal. The LC impedance matching circuit is disposed between the signal amplifying circuit and the antenna and is configured to transmit the amplified analog signal to the antenna to be further transmitted externally. The feedback calibration circuit includes a feedback inductive circuit and a calibration circuit. The feedback inductive circuit is configured to inductively couple to the LC impedance matching circuit to receive the amplified analog signal and generate a feedback signal. The calibration circuit is configured to determine a distorted amount of the feedback signal relative to the RF analog signal to modify an operation parameter of at least one of the signal transmission circuit and the signal amplifying circuit to decrease the distorted amount.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a communication apparatus having feedback calibration mechanism to dispose a feedback inductive circuit to efficiently filter a harmonic tone of an amplified analog signal and generate a feedback signal accordingly such that an accuracy of feedback calibration of a calibration circuit can be increased.

Figure 1:
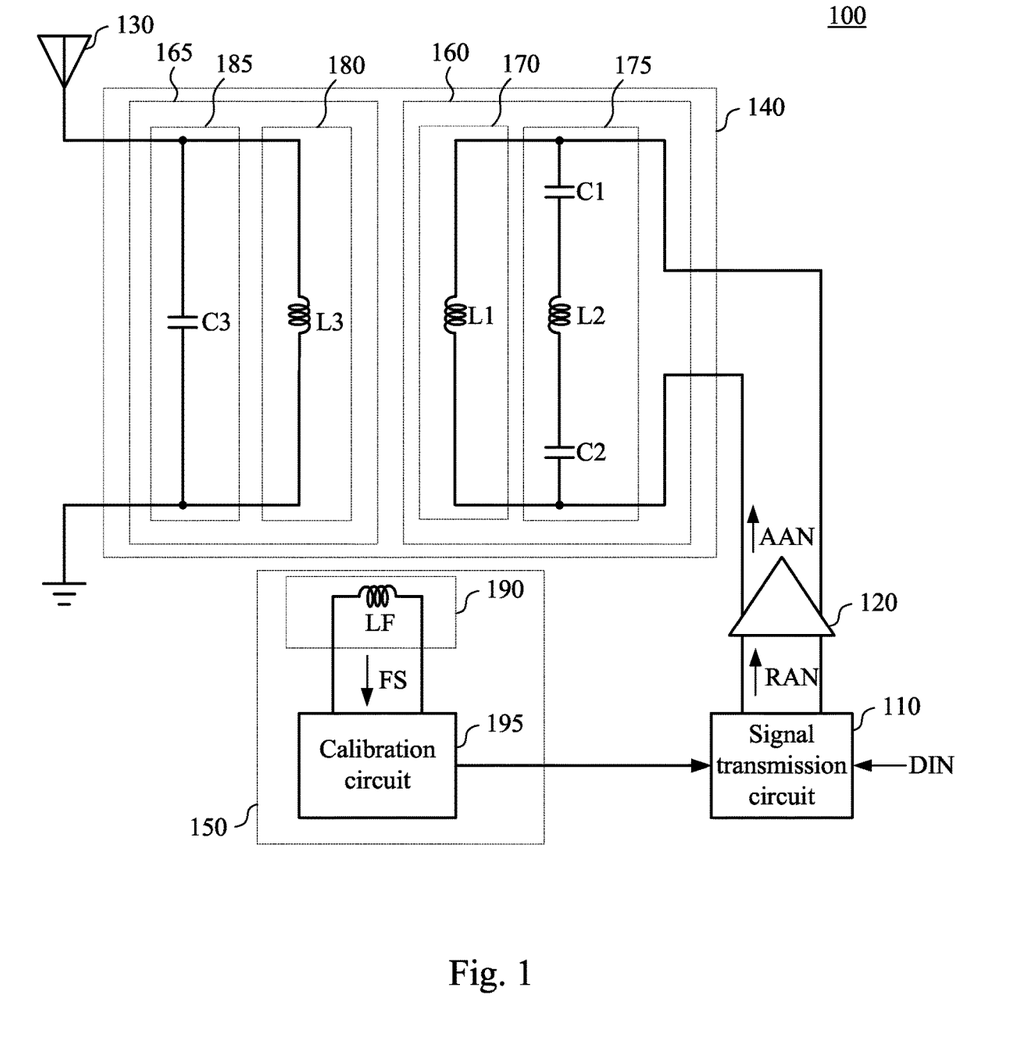
FIG. 1 illustrates a circuit diagram of a communication apparatus having feedback calibration mechanism according to an embodiment of the present invention.

Reference is now made to FIG. 1. FIG. 1 illustrates a circuit diagram of a communication apparatus 100 having feedback calibration mechanism according to an embodiment of the present invention. The communication apparatus 100 includes a signal transmission circuit 110, a signal amplifying circuit 120, an antenna 130, a LC impedance matching circuit 140 and feedback calibration circuit 150.

The signal transmission circuit 110 is configured to generate a RF analog signal RAN according to a digital signal DIN. In an embodiment, the signal transmission circuit 110 may include such as, but not limited to a digital signal processing circuit, a digital-to-analog conversion circuit, a baseband and RF signal processing circuit (not illustrated in the figure) to respectively perform digital signal process, digital-to-analog conversion and frequency upconversion and signal processing from baseband frequency to RF frequency on the digital signal DIN, so as to generate the RF analog signal RAN.

The signal amplifying circuit 120 is configured to amplify the RF analog signal RAN to generate an amplified analog signal AAN through such as, but not limited to two differential output terminals. In an embodiment, the signal amplifying circuit 120 is a power amplifier to perform signal amplification.

The LC impedance matching circuit 140 is disposed between the signal amplifying circuit 120 and the antenna 130 and is configured to provide impedance matching to transmit the amplified analog signal AAN to the antenna 130 to be further transmitted externally.

In the present embodiment, the LC impedance matching circuit 140 is electrically coupled to the two differential output terminals of the signal amplifying circuit 120 to receive the amplified analog signal AAN. The LC impedance matching circuit 140 includes a first LC circuit 160 and a second LC circuit 165.

The first LC circuit 160 is electrically coupled to the signal amplifying circuit 120 and includes a first inductive circuit 170 and a first capacitive circuit 175 coupled in parallel. In the present embodiment, the first inductive circuit 170 includes a first inductor L1. The first capacitive circuit 175 includes a first capacitor C1, a second inductor L2 and a second capacitor C2 coupled in series.

The second LC circuit 165 is electrically coupled to the antenna 130 and includes a second inductive circuit 180 and a second capacitive circuit 185 coupled in parallel. In the present embodiment, the second inductive circuit 180 includes a third inductor L3. The second capacitive circuit 185 includes a third capacitor C3.

It is appreciated that the configuration of the first LC circuit 160 and the second LC circuit 165 described above is merely an example. In different embodiments, the first LC circuit 160 and the second LC circuit 165 can be implemented by different combinations of parallel connections and series connections of capacitors, inductors or even resistors according to practical requirements for impedance matching.

The feedback calibration circuit 150 includes a feedback inductive circuit 190 and a calibration circuit 195.

The feedback inductive circuit 190 includes a feedback inductor LF configured to inductively couple the LC impedance matching circuit 140 to receive the amplified analog signal AAN and generate a feedback signal FS. The feedback inductor LF provides a filtering mechanism to the amplified analog signal AAN to decrease a harmonic tone in the feedback signal FS that corresponds to the amplified analog signal AAN.

The calibration circuit 195 is configured to determine a distorted amount of the feedback signal FS relative to the RF analog signal RAN to modify an operation parameter of at least one of the signal transmission circuit 110 and the signal amplifying circuit 120 to further decrease the distorted amount. In different embodiments, the calibration circuit 195 may modify different operation parameters to modify a non-linear term of the intermodulation, so as to increase the output linearity of the signal amplifying circuit 120.

In some approaches, the feedback calibration mechanism is performed by coupling the calibration circuit 195 through a capacitor directly to the signal amplifying circuit 120 to receive the amplified analog signal AAN and performing determination and calibration accordingly. However, such a method obtains a distorted amount having an offset due to the harmonic tone in the amplified analog signal AAN that is difficult to be filtered. The accuracy of calibration drops.

On the contrary, the communication apparatus 100 of the present invention disposes the feedback inductor LF to decrease the harmonic tone of the feedback signal FS that corresponds to the amplified analog signal AAN to obtain a more accurate distorted amount. The accuracy of feedback calibration can therefore be increased. Further, the first capacitor C1, the second inductor L2 and the second capacitor C2 included in the first capacitive circuit 175 of the first LC circuit 160 form a notch filter to further decrease the harmonic tone of the feedback signal FS that corresponds to the amplified analog signal AAN, to further benefit the accuracy of feedback calibration.

In a numerical example, the parameters (e.g., capacitance and inductance) of each of the elements in the first LC circuit 160 and the feedback inductive circuit 190 are set to filter the third order harmonic tone (7.5 GHz) of the amplified analog signal AAN under the operation frequency of 2.5 GHz.

Under such a condition, a ratio of the fundamental tone and the third order harmonic tone of the two terminals of the first inductor L1 is 14.14 dBc. A ratio of the fundamental tone and the third order harmonic tone of the two terminals of the third inductor L3 is 19.72 dBc. A ratio of the fundamental tone and the third order harmonic tone of the two terminals of the feedback inductor LF is 26.40 dBc. As a result, the feedback signal FS generated by the feedback inductor LF greatly reduces the third order harmonic tone such that a more accurate feedback result is obtained.

Figure 2:
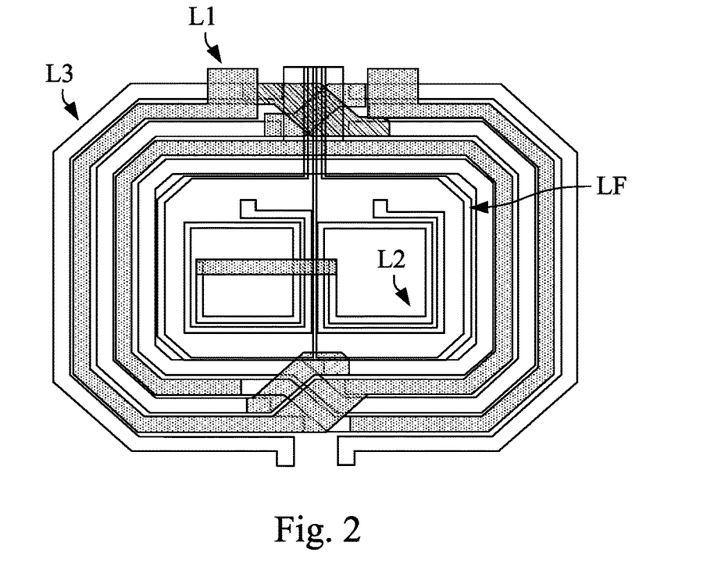
FIG. 2 illustrates a layout diagram of the first inductor, the second inductor, the third inductor and the feedback inductor according to an embodiment of the present invention.

Reference is now made to FIG. 2 and FIG. 3A to FIG. 3D at the same time. FIG. 2 illustrates a layout diagram of the first inductor L1, the second inductor L2, the third inductor L3 and the feedback inductor LF according to an embodiment of the present invention. FIG. 3A to FIG. 3D illustrate individual layout diagrams respectively corresponding to the first inductor L1, the second inductor L2, the third inductor L3 and the feedback inductor LF according to an embodiment of the present invention.

In an embodiment, the first inductor L1, the second inductor L2 and the third inductor L3 included in the impedance matching circuit 140 are formed in the same circuit layer. For example, the first inductor L1, the second inductor L2 and the third inductor L3 are formed in a M7 layer. In an embodiment, a part of the bridging line sections of the first inductor L1 are formed in a RDL layer.

Figure 3A:
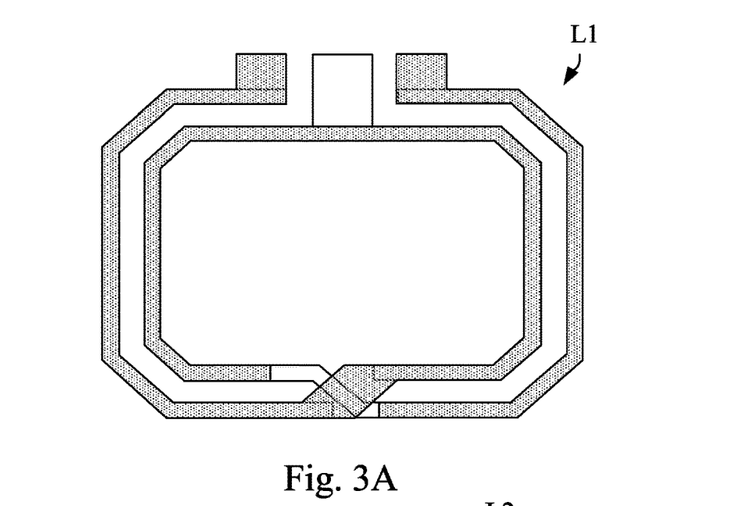
FIG. 3A to FIG. 3D illustrate individual layout diagrams respectively corresponding to the first inductor, the second inductor, the third inductor and the feedback inductor according to an embodiment of the present invention.
Figure 3B:
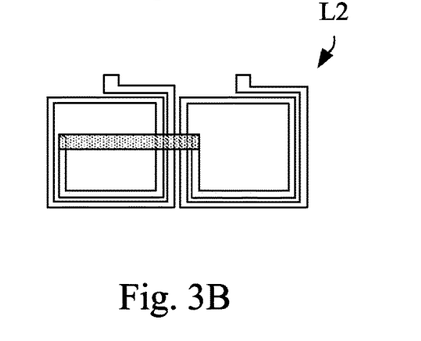
Figure 3C:
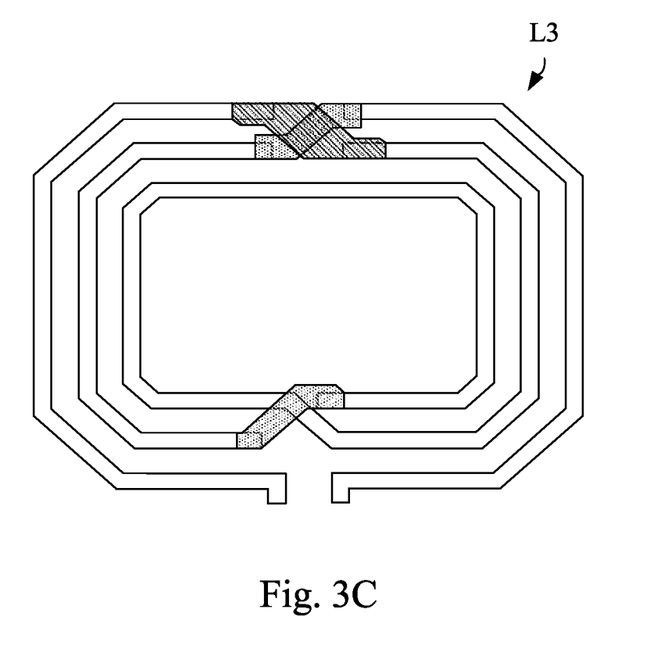
Figure 3D:
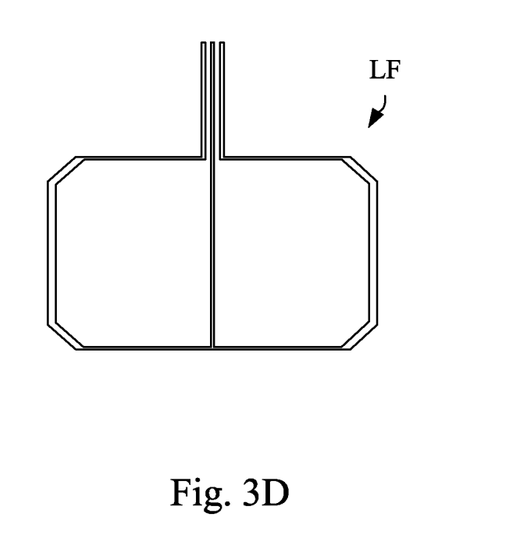

On the contrary, the feedback inductor LF is formed in another circuit layer different from the circuit layer that the LC impedance matching circuit 140 is formed. For example, the feedback inductor LF is formed in a M6 layer. Besides, in the present embodiment, a coil area of the feedback inductor LF is smaller than a coil area of the impedance matching circuit 140 that includes the first inductor L1, the second inductor L2 and the third inductor L3.

Figure 4:
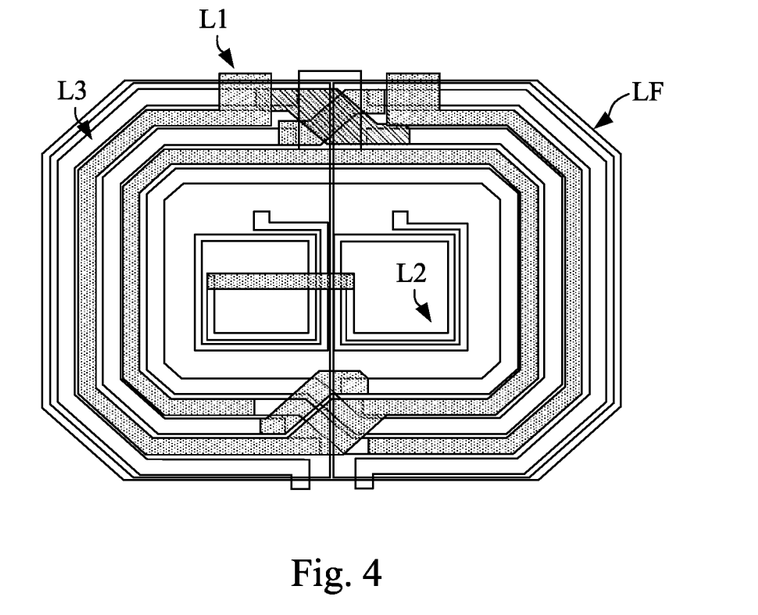
FIG. 4 illustrates a layout diagram of the first inductor, the second inductor, the third inductor and the feedback inductor according to another embodiment of the present invention.

Reference is now made to FIG. 4. FIG. 4 illustrates a layout diagram of the first inductor L1, the second inductor L2, the third inductor L3 and the feedback inductor LF according to another embodiment of the present invention.

The first inductor L1, the second inductor L2 and the third inductor L3 illustrated in FIG. 4 are the same as those illustrated in FIG. 2. However, in the present embodiment, the coil area of the feedback inductor LF is larger than the coil area of the impedance matching circuit 140 that includes the first inductor L1, the second inductor L2 and the third inductor L3.

It is appreciated that the layout and the routing of the first inductor L1, the second inductor L2, the third inductor L3 and the feedback inductor LF described above are merely an example. In other embodiments, the first inductor L1, the second inductor L2, the third inductor L3 and the feedback inductor LF can be formed by using other layouts and routings.

Figure 5:
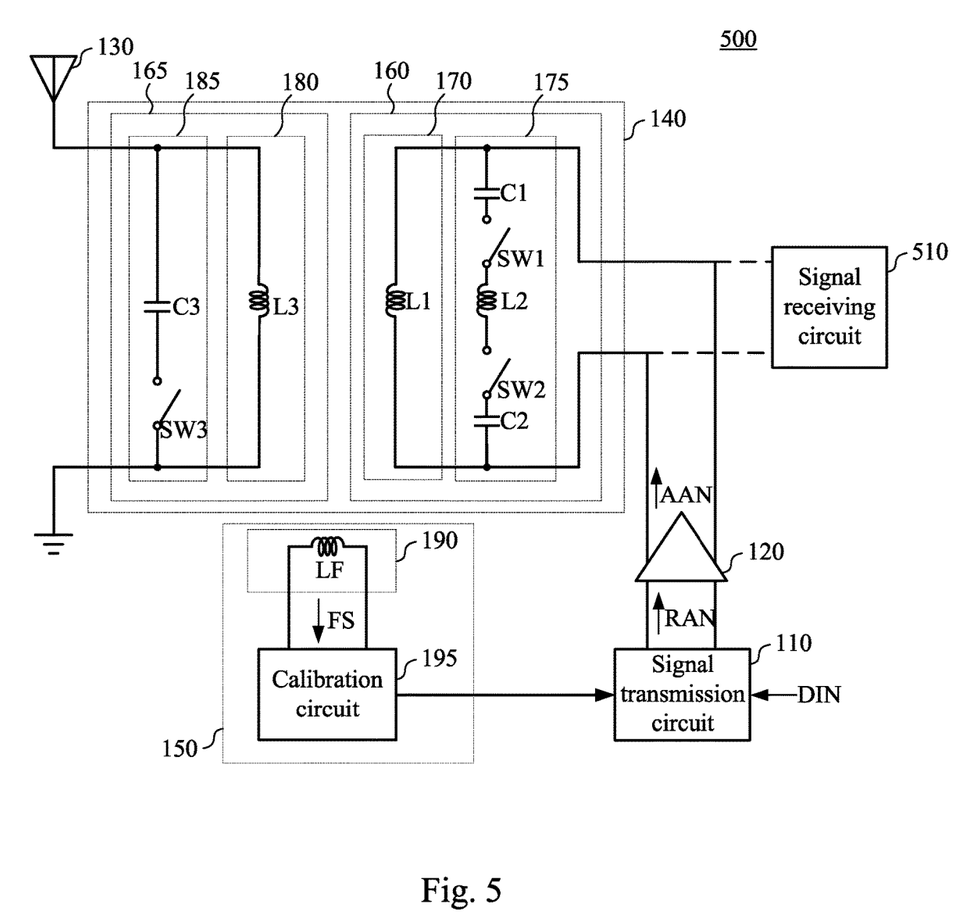
FIG. 5 illustrates a circuit diagram of a communication apparatus according to another embodiment of the present invention.

Reference is now made to FIG. 5. FIG. 5 illustrates a circuit diagram of a communication apparatus 500 according to another embodiment of the present invention.

The communication apparatus 500 in FIG. 5 is similar to the communication apparatus 100 in FIG. 1 and includes the signal transmission circuit 110, the signal amplifying circuit 120, the antenna 130, the LC impedance matching circuit 140 and feedback calibration circuit 150. Further, the LC impedance matching circuit 140 includes the first LC circuit 160 and the second LC circuit 165. The identical components are not described herein.

In the present embodiment, in the first capacitive circuit 175 of the first LC circuit 160, the first capacitor C1 and the second inductor L2 further includes a first switch SW1 formed therebetween. The second inductor L2 and the second capacitor C2 further includes a second switch SW2 formed therebetween. The first capacitive circuit 185 in the second LC circuit 165 includes a third capacitor C3 and a third switch SW3 coupled in series.

In an embodiment, the communication apparatus 500 is a transceiver. Besides the signal transmission circuit 110, the communication apparatus 500 further includes a signal receiving circuit 510. In a signal transmission mode, the antenna 130 performs signal transmission with the signal transmission circuit 110 through the LC impedance matching circuit 140. Under such a condition, the first switch SW1, the second switch SW2 and the third switch SW3 are conducted. In a signal receiving mode, the antenna 130 performs signal receiving with the signal receiving circuit 510 through the LC impedance matching circuit 140. Under such a condition, the first switch SW1, the second switch SW2 and the third switch SW3 stops to be conducted.

Since the signal transmission circuit 110 and the signal receiving circuit 510 have different impedance matching requirements, the first switch SW1, the second switch SW2 and the third switch SW3 can operate between a conductive state and a non-conductive state under the signal transmission mode and the signal receiving mode to provide different amounts of impedance matching.

Figure 6:
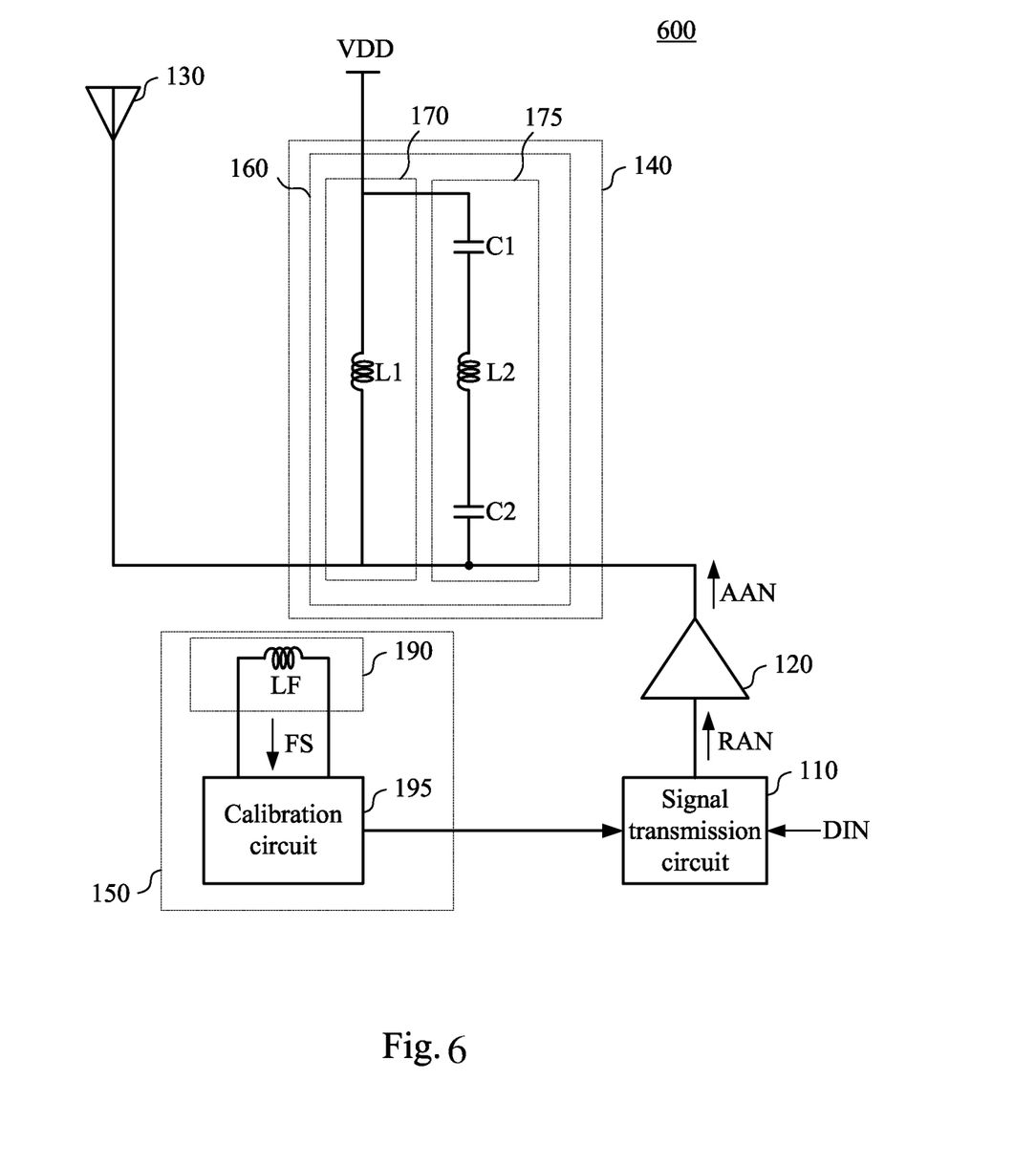
FIG. 6 illustrates a circuit diagram of a communication apparatus according to yet another embodiment of the present invention.

Reference is now made to FIG. 6. FIG. 6 illustrates a circuit diagram of a communication apparatus 600 according to yet another embodiment of the present invention.

The communication apparatus 600 in FIG. 6 is similar to the communication apparatus 100 in FIG. 1 and includes the signal transmission circuit 110, the signal amplifying circuit 120, the antenna 130, the LC impedance matching circuit 140 and feedback calibration circuit 150. The identical components are not described herein.

In the present embodiment, the signal amplifying circuit 120 generates the amplified analog signal AAN amplified analog signal AAN. The LC impedance matching circuit 140 only includes the first LC circuit 160 and is electrically coupled between a supply voltage VDD and the single output terminal. As a result, the communication apparatus of the present invention can also be applied to the signal amplifying circuit 120 having a single output.

It is appreciated that the embodiments described above are merely an example. In other embodiments, it should be appreciated that many modifications and changes may be made by those of ordinary skill in the art without departing, from the spirit of the disclosure.

In summary, the present invention discloses the communication apparatus having feedback calibration mechanism that disposes a feedback inductive circuit to efficiently filter a harmonic tone of an amplified analog signal and generate a feedback signal accordingly such that an accuracy of feedback calibration of a calibration circuit can be increased.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A communication apparatus having feedback calibration mechanism, comprising:
   a signal transmission circuit configured to generate a RF analog signal according to a digital signal;
   a signal amplifying circuit configured to amplify the RF analog signal to generate an amplified analog signal;
   an antenna;
   a LC impedance matching circuit disposed between the signal amplifying circuit and the antenna and configured to transmit the amplified analog signal to the antenna to be further transmitted externally, wherein the LC impedance matching circuit comprises a first LC circuit electrically coupled to the signal amplifying circuit and comprising a first inductive circuit and a first capacitive circuit coupled in parallel, in which the first inductive circuit comprises a first inductor and the first capacitive circuit further comprises a first capacitor, a second inductor and a second capacitor coupled in series; and
   a feedback calibration circuit comprising:
   a feedback inductive circuit configured to inductively couple to the LC impedance matching circuit without physically coupling to the LC impedance matching circuit, so as to receive the amplified analog signal and generate a feedback signal, wherein the feedback inductive circuit includes a feedback inductor; and
   a calibration circuit configured to determine a distorted amount of the feedback signal relative to the RF analog signal to modify an operation parameter of at least one of the signal transmission circuit and the signal amplifying circuit to decrease the distorted amount.

2. The communication apparatus of claim 1, wherein the first capacitive circuit and the feedback inductive circuit are configured to decrease a harmonic tone in the feedback signal that corresponds to the amplified analog signal.

3. The communication apparatus of claim 1, wherein the first capacitor and the second inductor comprise a first switch formed therebetween, the second inductor and the second capacitor comprise a second switch formed therebetween;
   the first switch and the second switch are conducted when the antenna operates in a signal transmission mode to perform signal transmission with the signal transmission circuit through the LC impedance matching circuit; and
   the first switch and the second switch stop to be conducted when the antenna operates in a signal receiving mode to perform signal receiving with a signal receiving circuit through the LC impedance matching circuit.

4. The communication apparatus of claim 1, wherein the LC impedance matching circuit further comprises a second LC circuit, in which the second LC circuit is electrically coupled to the antenna and comprises a second inductive circuit and a second capacitive circuit coupled in parallel;
   the second inductive circuit comprises a third inductor and the second capacitive circuit comprises a third capacitor.

5. The communication apparatus of claim 4, wherein the second capacitive circuit comprises the third capacitor and a third switch coupled in series;
   the third switch is conducted in a signal transmission mode that the antenna performs signal transmission with the signal transmission circuit through the LC impedance matching circuit; and
   the third switch stops to be conducted in a signal receiving mode that the antenna performs signal receiving with a signal receiving circuit through the LC impedance matching circuit.

6. The communication apparatus of claim 1, wherein the signal amplifying circuit generates the amplified analog signal through two differential output terminals and the LC impedance matching circuit is electrically coupled to the two differential output terminals.

7. The communication apparatus of claim 1, wherein the signal amplifying circuit generates the amplified analog signal through a single output terminal, and the LC impedance matching circuit only comprises the first LC circuit and is electrically coupled between a supply voltage and the single output terminal.

8. The communication apparatus of claim 1, wherein the LC impedance matching circuit is formed in a first circuit layer and has a first coil area, the feedback inductive circuit is formed in a second circuit layer different from the first circuit layer and has a second coil area, and the second coil area is selectively to be larger than the first coil area or smaller than the first coil area.

* * * * *